(12) United States Patent  
Lecomte et al.

(10) Patent No.: US 7,974,280 B2  
(45) Date of Patent: *Jul. 5, 2011

(54) DISTRIBUTED AND SECURED METHOD AND SYSTEM FOR PROTECTING AND DISTRIBUTING AUDIO-VISUAL FLOWS

(75) Inventors: Daniel Lecomte, Paris (FR); Reda Hosny, Paris (FR); Mohammed Lamtouni, Clamart (FR)

(73) Assignee: Querell Data Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/564,693

(22) Filed: Sep. 22, 2009

(65) Prior Publication Data

US 2010/0011393 A1 Jan. 14, 2010

Related U.S. Application Data

(63) Continuation of application No. 11/344,897, filed on Feb. 1, 2006, now Pat. No. 7,613,182, which is a continuation of application No. PCT/FR2004/050381, filed on Aug. 11, 2004.

(30) Foreign Application Priority Data

Aug. 11, 2003 (FR) ..................................... 03 50423

(51) Int. Cl.  
*H04L 12/56* (2006.01)  
*H04L 7/167* (2006.01)  
(52) U.S. Cl. ............. 370/389; 360/60; 380/201; 386/94

(58) Field of Classification Search .................. None  
See application file for complete search history.

(56) References Cited

U.S. PATENT DOCUMENTS 5,590,199 A * 12/1996 Krajewski et al. ............ 713/159

(Continued)

FOREIGN PATENT DOCUMENTS

EP 0450841 10/1991

(Continued)

OTHER PUBLICATIONS

Eskicioglu, Ahmet M., et al; "An Integrated Approach to Encrypting Scalable Video"; Aug. 2002; IEEE.*

(Continued)

*Primary Examiner* — Robert C Scheibel  
(74) *Attorney, Agent, or Firm* — Connolly Bove Lodge & Hutz LLP

(57) ABSTRACT

A process for secure distribution of digital audiovisual streams according to a standard, normalized or proprietary format, on which streams a separation of the stream into two parts is made prior to transmission to equipment of an addressee to generate a modified main stream having a format of the original stream and complementary information of any format including digital information suitable to permit reconstruction of the original stream, wherein a transmission is made, by separate paths during distribution of the modified main stream from a distribution server and of the complementary information to the equipment of the addressee from a secure central server passing via at least one local server connecting the equipment of the addressee to the local server via at least one access point.

14 Claims, 4 Drawing Sheets

U.S. PATENT DOCUMENTS

| | | | | |
|---|---|---|---|---|
| 6,091,769 | A * | 7/2000 | Moon | 375/240 |
| 6,415,031 | B1 * | 7/2002 | Colligan et al. | 380/200 |
| 6,886,040 | B1 * | 4/2005 | Fitzgerald | 709/224 |
| 7,151,832 | B1 * | 12/2006 | Fetkovich et al. | 380/210 |
| 7,382,969 | B2 * | 6/2008 | Dawson | 386/94 |
| 7,613,182 | B2 * | 11/2009 | Lecomte et al. | 370/389 |
| 2003/0210789 | A1 * | 11/2003 | Farnham et al. | 380/270 |
| 2004/0168185 | A1 * | 8/2004 | Dawson et al. | 725/38 |
| 2006/0075135 | A1 * | 4/2006 | Rambhia | 709/238 |

FOREIGN PATENT DOCUMENTS

| | | |
|---|---|---|
| WO | WO-00/60846 | 10/2000 |
| WO | WO-01/11883 | 2/2001 |
| WO | WO-03/065731 | 8/2003 |

OTHER PUBLICATIONS

Ahmet M. Eskicioglu et al., "An Integrated Approach to Encrypting Scalable Video," IEEE, vol. 1, Aug. 26, 2002, pp. 573-576.

* cited by examiner

US 7,974,280 B2

DISTRIBUTED AND SECURED METHOD AND SYSTEM FOR PROTECTING AND DISTRIBUTING AUDIO-VISUAL FLOWS

RELATED APPLICATION

This application is a continuation of U.S. patent application Ser. No. 11/344,897, filed on Feb. 1, 2006 (now U.S. Pat. No. 7,613,182, issued on Nov. 3, 2009) and incorporated by reference herein, which is a continuation of International Application No. PCT/FR2004/050381, with an international filing date of Aug. 11, 2004 (WO 2005/018232 A2, published Feb. 24, 2005), which is based on French Patent Application No. 03/50423, filed Aug. 11, 2003.

FIELD OF THE INVENTION

This invention relates to the area of the distribution of digital audiovisual sequences.

BACKGROUND

It is currently possible to transmit audiovisual programs in digital form via broadcasting networks of the microwave (herzian), cable, satellite type, etc. or via telecommunication networks of the DSL type (Digital Subscriber Line) or BLA type of (Local Radio Loop) or via DAB networks (Digital Audio Broadcasting) as well as via any wireless telecommunication network of the GSM, GPRS, UMTS, Bluetooth, WiFi types, etc. These works are frequently encrypted or scrambled by various well known means to avoid pirating.

As concerns the distributed systems based on the client-server principle characterized by "caching," the prior art also contains two main types of systems that are classified according to the content treated by this "caching." The term "caching" denotes the possibility of being able to temporarily hold a copy of contents or of data (permanently stored in a central server) at a point or at different points of the network (e.g., local servers) to serve the requests of clients the closest to these points, thus reducing the overload on the server from contents and consequently optimizing the transmission rate used at the access points.

The first type processes data whose distribution has no time restrictions (systems for the distribution of files by "caching") and the second type concerns the processing of multimedia (audio/video) data.

The systems for conventional distributed files such as Sun NFS, Apollo Domain, Andrew, IBM AIX, DS, AT&T RFS perform the "caching" of files locally, do not have the possibility of making the "caching" of files in proximate or remote nodes and cannot allocate local servers for applying the "caching" to files. Moreover, the conventional distributed systems characterized by "caching" have a granularity of the size of a file and consequently the possibilities of having a scalability of the distribution of the contents via the network is greatly reduced.

On the other hand, other distributed multimedia systems characterized by "caching" such as the "Berkeley Distributed VOD," for example, do not obtain a "caching" that is completely secure and personalized for each user and also have limited capacities of scalability while frequently being penalized by the limited bandwidth of the networks.

SUMMARY OF THE INVENTION

This invention is related to a process for secure distribution of digital audiovisual streams according to a standard, normalized or proprietary format, on which streams a separation of the stream into two parts is made prior to transmission to equipment of an addressee to generate a modified main stream having a format of the original stream and complementary information of any format including digital information suitable to permit reconstruction of the original stream, wherein a transmission is made, by separate paths during distribution of the modified main stream from a distribution server and of the complementary information to the equipment of the addressee from a secure central server passing via at least one local server connecting the equipment of the addressee to the local server via at least one access point.

This invention also relates to a system that securely distributes audiovisual streams according to the process, including a device for separating the original video stream into a modified main stream and into complementary information, at least one multimedia server containing protected audiovisual streams, at least one secure central server from which the complementary information is distributed, at least one telecommunication network, at least one local server communicating with at least one access point for connection to the addressed equipment and a device on the addressed equipment for reconstructing the original audiovisual stream as a function of the modified main stream and the complementary information.

DETAILED DESCRIPTION

Figure 1:
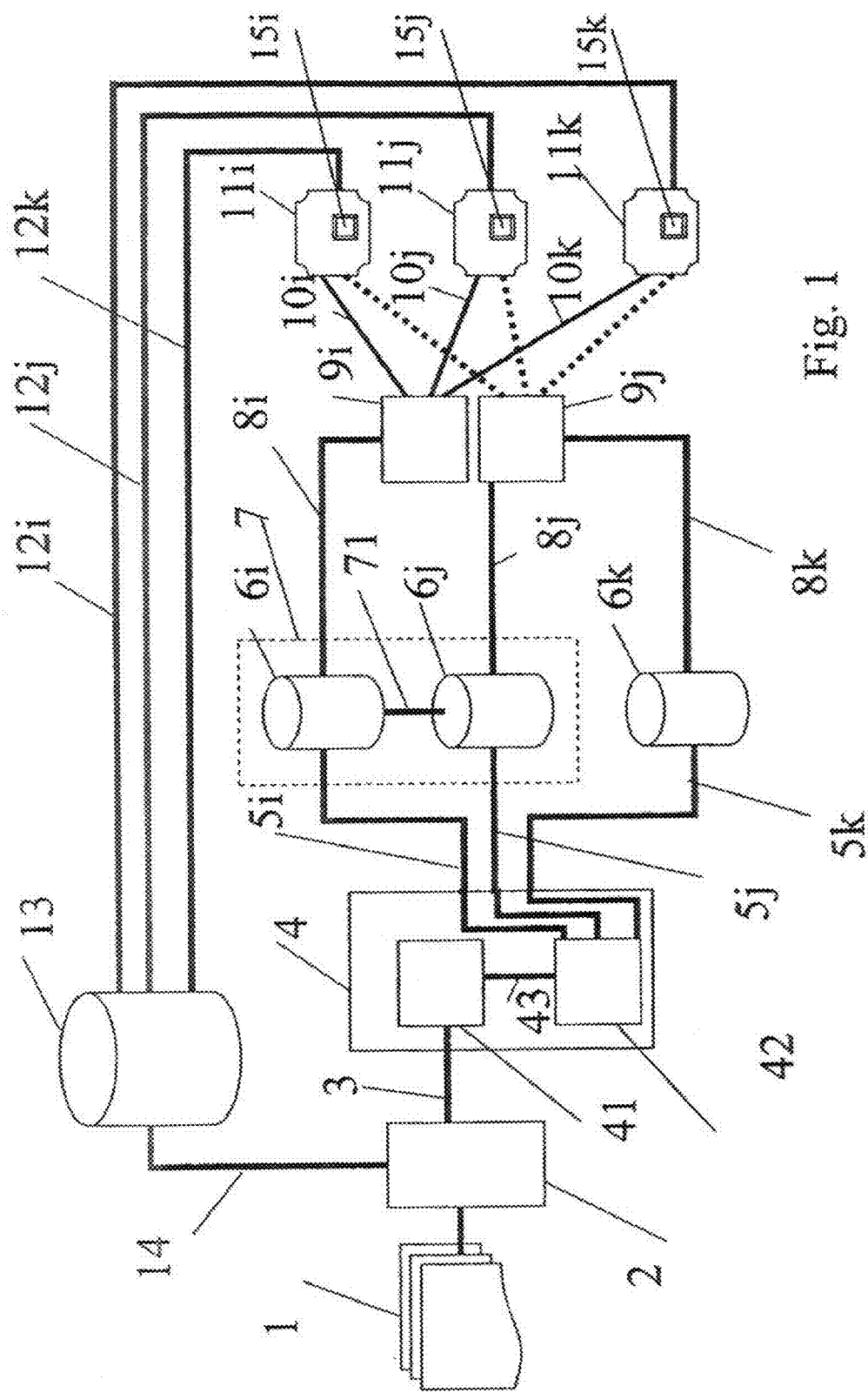
FIG. 1 is a schematic view of a client-server system in accordance with selected aspects of the invention.

This invention provides a process and system that permit 1) the visual and/or auditory protecting of an audiovisual sequence stemming from a digital standard, a digital norm or a proprietary standard, the distributing of it via a telecommunication network distributed in a secure manner and 2) reconstitution of the original content from a digital audiovisual stream on a recomposition module of the addressee's equipment.

The invention relates more particularly to a device capable of transmitting in a secure manner and via a distributed network a set of high-quality audiovisual streams to a viewing screen and/or to an audio output belonging to a terminal or display device such as a television screen, a computer or even a mobile telephone, a mobile iPDA terminal or a PDA (Personal Digital Assistant) or the like while preserving the audiovisual quality, but avoiding fraudulent use such as the possibility of making pirated copies of the broadcast contents.

The invention relates to a process and a client-server system that protects the audiovisual contents by separating them into two parts, the second part of which is indispensable for reconstitution of the original stream, the latter being restored as a function of recombining the first part with the second part.

For example, the process may separate the audiovisual stream into two parts in such a manner that the first part, called "modified main stream," contains the quasi totality of the initial information, for example, more than 95%, and a second part, called "complementary information," containing targeted elements of the initial information and which is of a very small size compared to the first part.

In distinction to the prior art this invention provides a system characterized by "caching" in the sense in that it processes data in real time, but with the particularity that the processing is performed on connected elements of segments that are independent entities from the processing point of view and the "caching" point of view, which segments carry data for the reconstruction of the complete audiovisual information and are personalized for each user and sent to the equipment of addressees in real time via a low bandwidth network of a local server playing the role of controller for securing the content.

The protection applied to the content distributed by the secure distributed system is advantageously based on the principle of the suppression, removal or deletion and replacement of certain information present in the original encoded audiovisual signal by any method, e.g.: substitution, modification, permutation or shifting of the information. This protection is also based on a knowledge of the structure of the stream. The solution is extracted and permanently retained in a secure server connected to the broadcasting and transmitted network in the complementary information a part of the audiovisual program recorded at the user's or directly broadcasted, which part is of primary importance for reconstituting the audiovisual program on a screen or on an audio output of a terminal, but has a very low volume relative to the total volume of the digital audiovisual program recorded at the user's or received in real time. The missing part may be transmitted via the secure, distributed broadcasting or transmitting network at the moment of viewing or listening to the audiovisual program. The data removed is substituted by random or calculated data called decoys.

The fact of having removed and substituted with decoys a part of the original data of the traditional audiovisual stream during generation of the modified main stream does not permit restitution of the original stream only from the data of the modified main stream. The modified main stream is totally compatible with the format of the original stream and can therefore be copied and read by a reader, but it is completely incoherent from the viewpoint of human visual and auditory perception.

Once the digital stream is separated into two parts, the largest part of the audiovisual stream, the modified main stream, is then transmitted via a classic broadcasting network whereas the lacking part, namely the complementary information, is sent on demand via a narrow band telecommunication network such as the classic telephone or cellular networks of the GSM, GPRS or UMTS or by using a small part of a network of the DSL or BLR type, or by using a subset of the broadband shared on a cable network, or also via a physical support such as a memory card or any other support. However, the two networks can be combined while retaining the two separate transmission paths. The audiovisual stream is reconstituted on the addressee's equipment by a synthesizing module from the modified main stream and the complementary information sent piece by piece during use of the audiovisual stream.

Selected aspects of the subject matter of this invention relates to the secure transmission, after identification and localization of the user, of the complementary information via a distributed network in such a manner as to prevent it from being able to be copied or totally falling into the possession of the user or of any bad-intentioned person.

Aspects of the invention also concern a process for the secure distribution of digital audio streams according to a standard, normalized or proprietary format, on which streams a separation of the stream into two parts is made prior to the transmission to the equipment of the addressee to generate a modified main stream having the format of the original stream and complementary information of any format comprising the digital information suitable for permitting the reconstruction of the original stream, characterized in that a transmission is made, by separate paths during the distribution phase, of the modified main stream from a distribution server and the complementary information to the equipment of the addressee from a secure central server passing via at least one local server connecting the equipment of the addressee to the local server via at least one access point.

The secure central server is preferably administered by a trusted third party.

The process can optionally have the following additional characteristics:

the secure central server performs segmentation of the complementary information with each segment corresponding to a subjectively coherent entire audiovisual element in units of streams of complementary information with a variable size, the units of streams of complementary information are organized in several layers corresponding to the layers of scalability of the original audiovisual stream, prior to sending to a local server, the secure central server carries out encryption of the units of the streams of complementary information with a first encryption key, before sending the complementary information from the local server to the addressed equipment, the complementary information is decrypted with the first encryption key and re-encrypted with a second encryption key, encryption of the complementary information with the second key is adaptive as a function of the throughput (transmission rate) capacities of the addressed equipment, the second encryption key is constructed during the authentication stage between the addressed equipment and a local server, the local server generating a session key with the client becomes a host server of the session during the entire lifetime of the session key, the second encryption key is valid solely during the time of a continuous session between the addressed equipment and at least one local server, an access ticket is generated per session, containing information concerning the second session key, valid solely during the session and expiring at the end of the validity of the access ticket, distribution of the complementary information onto a distributed network has the property of scalability in the transmission rate, distribution of the complementary information is carried out by applying mechanisms for regulating the quantity of information distributed into the distributed network, taking account of the capacities and the restrictions of the distributed network in terms of storage and access time.

Other aspects of the invention also relate to a system for the secure distribution of audiovisual streams for carrying out the process comprising a device for the separation of the original video stream into a modified main stream and complementary information, at least one multimedia server containing the protected audiovisual streams, at least one secure central server from which the complementary information is distributed, at least one telecommunication network, at least one local server communicating with at least one access point for the connection to the addressed equipment and a device on the addressed equipment for the reconstruction of the original audiovisual stream as a function of this modified main stream and of the complementary information.

Selected aspects of the invention will be better understood with the aid of exemplary embodiments and stages discussed in detail in the following.

A preferred, but non-limiting exemplary embodiment of the process that meets the criteria of security and reliability is illustrated by the client-server system shown in FIG. 1.

The audiovisual stream in digital form 1 is separated into two parts by analysis and scrambling module 2. Modified main stream 14 is stored in multimedia server 13 and sent in real time to the client via broadband network 12 or stored in advance on the backup device of terminal 11 of the user. Complementary information 3 is sent to storage and segmentation module 41 of secure central server 4.

Once the complementary information is sent solely on demand, its distribution in real time and its personalization for each user is realized by virtue of the property of scalability in the transmission rate on the transport networks. The notion of "scalability in the transmission rate" is defined as the capacity of a network to manage, modify, distribute and adapt the transmission rate of the streams transiting as a function of the available or negotiated broadband and as a function of the network congestions. In order to respond to the requirements of sending in real time and by virtue of the low transmission rate of the complementary information for the transmission, the process comprises a stage for the segmentation of the complementary information in module 41, that generates data segments of variable size, each segment corresponding to an entire, subjectively coherent audiovisual element such as an image or a frame, a group of images or GOP (Group of Pictures) in an MPEG-2 stream, for example. The segmentation may be carried out in a single stage after generation of the complementary information 3 and produces a series of segments designated as "streams of complementary information" that remain stored in storage and segmentation module 41. The stream of complementary information may be generated in real time.

The segmentation stage of the complementary information is followed by a stage of encapsulation in blocks of data and a stage of encryption in module 42 where it remains available at the request of local servers 6. The stream of complementary information is continuously sent to terminal 1 of the user in the form of blocks, a block containing a segment to which access or "header" information was added comprising data relative to the mobility of the user (position, rights, network access points, for example) and data relative to the encryption keys of the stream of complementary information. A block is the fundamental communication unit and is also called UFIC (unit of a complementary information stream).

When the user 11 wishes, e.g., to view a sequence, the user connects via equipment to the module for managing access points 9 that redirects the requests to a local server 6 that addresses for its part the request to central server 4 in the case of a first request relative to this stream.

Central server 4 requires an authentication on the part of local servers 6 when it receives the request to decide about sending streams of complementary information requested, which is solely by way of audiovisual sequence. The authentication dialog is established with the central server and, after local server 6 has been recognized by central server 4, the stream segmented in module 41, sent via link 43 to module 42 and encrypted in module 42 by a first key that is unique by title and by local server, is transported via link 5. Each stream of complementary information is sent to the local server in encrypted form with the first key that is unique regarding the stream for each server.

Figure 2:
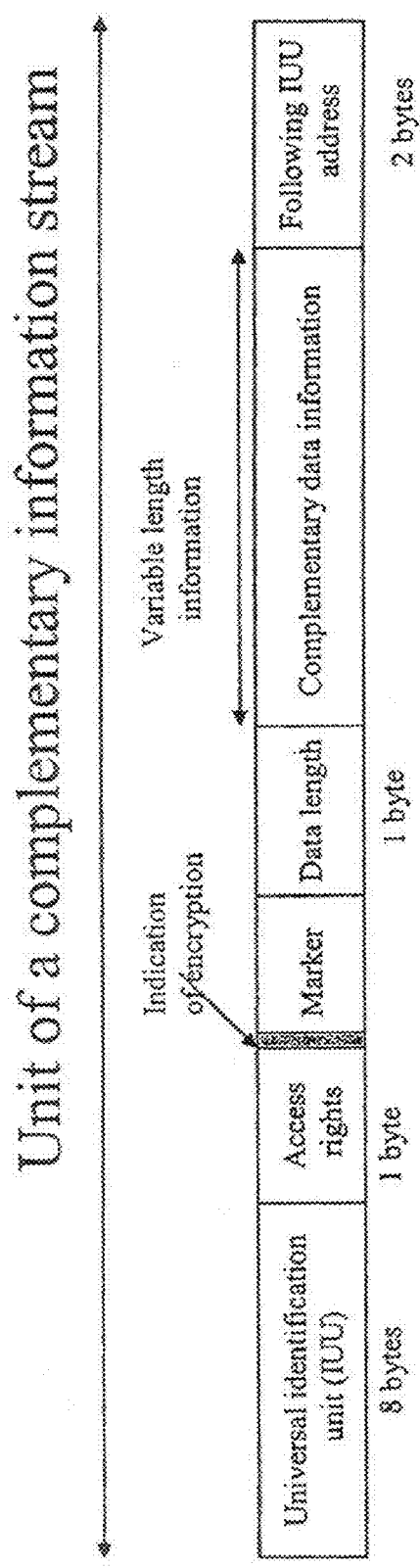
FIG. 2 is a schematic representation of the structure of a unit of a complementary information stream in accordance with selected aspects of the invention.

FIG. 2 presents the structure of a unit of a complementary information stream. A universal identification unit (IUU) is found at the start of each unit, coded, e.g., with 8 bytes, that is considered as a universal address (e.g., a URL ("Universal Resource Locator") in the World Wide Web system, by means of which the server can localize the UFIC requested. The next field is reserved for the access rights that define the access and the decryption of the elements of the complementary information stream necessary for the recomposition of the audiovisual stream. This field is updated by encapsulation and encryption module 42 when central server 4 receives a request from a local server. This field is advantageously also modified by the local server as a function of the user rights.

Another field contained in the UFIC is the "data length" field, that contains the size, e.g., in bytes, of the encrypted UFIC followed by the "data" field containing the values of the encrypted UFIC. The structure ends with an indicator designating the address of the next UFIC required for this stream with the aid of a differential address.

The data contained in the "marker" field is relative to the characteristic of scalability of the transmission rate of the system, that is, to the rate of transmission/reception and the processing capacity for decrypting the UFIC's.

For example, since the transmission rates used in mobile terminals of the portable telephone type, PDA ("Personal Digital Assistant") are low, an adaptive method for encrypting UFIC's as a function of the bandwidth available or negotiated for each user of the mobile network is used.

Each UFIC contains in the "marker" field an indication coded on a bit about its own status: encrypted or non-encrypted. The local server begins with a negotiation phase about the capacities of the user's terminal in terms of bandwidth and about the price that the latter is ready to pay, and decides whether the encryption mode is complete or partial, which is indicated on the access ticket. The partial encryption is used between the local servers and the clients whereas a complete encryption is always applied between the central server and the local servers.

Local server 6 contains a list of audiovisual programs available in central server 4. As the storage capacities in the local servers are limited, e.g., in the case in which several clients are simultaneously connected, these servers make use of mechanisms for replacing data in the case that their storage capacities are exceeded or overloaded.

For example, one method of managing the storage is the method of the least used recent elements or LRU ("Least Recently Used"). Another method is the BE-LRU (Back-End LRU). The server manages the place for the new entering data by replacing streams that were not recently addressed by beginning with the UFIC's of the end of these streams, thus assuring a granularity (precision) of replacement equal to one UFIC. Thus, this mechanism allows minimization of the frequency of effective replacements of different streams. Also, an uploading in advance ("pre-fetching") of the complementary information stream of central server 4 to local servers 6 is applied for the efficient managing of the central server. In this manner, a too great number of requests from the local servers is avoided. The method used is the inverse of that of the replacement, that is to say that the uploading is carried out by beginning with the recently most addressed streams and a part of the beginning (corresponding, e.g., to the first minutes of the audiovisual sequence) of these streams is transferred to the local servers.

A dialog is then established between local server 6 and viewing terminal 11 based on a method of authentication to generate an access ticket that contains information concerning a second encryption key. The second key is valid only during the session and expires at the end of the validity of the access ticket, which access ticket contains information about the host server, about the lifetime of the key, but never the key itself. The second key is called the "session key," with which the local server re-encrypts the UFIC's just before sending to terminal 11 after having decrypted them with the first key. Such a ticket system permits the client to have a key valid for a limited time period for the recovery of a complementary information stream during the "lifetime" ("Time To Live" (TTL)) of the session key. The management of the access tickets is carried out by local server 6 and the access ticket is valid even if the user changes the network access point and as a consequence changes the local server, by virtue of the system for distributing and updating the ticket in a geographic zone 7.

Figure 3:
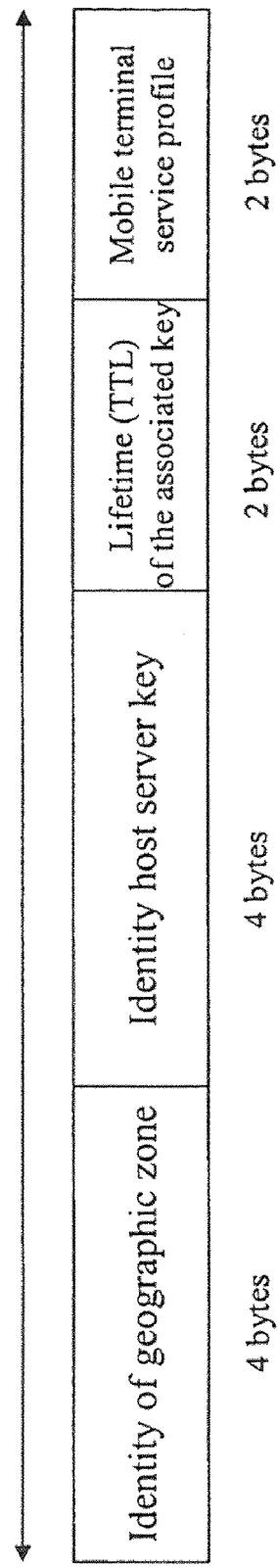
FIG. 3 is a schematic representation of the composition of an access ticket used in the distribution system in accordance with aspects of the invention.

FIG. 3 shows the composition of the access ticket used in the distributed system. The first four bytes correspond to the identity of the geographic zone 7 in which the local server is situated and are followed by four bytes representing the identity of the server that is a generator of the session key corresponding to this ticket. The two following bytes contain the information on the lifetime of the associated session key. The last couple of bites is reserved for information linked to the service profile between the addressed terminal and the local server, e.g., the decision to apply a type of partial encryption corresponding to the bandwidth allocated to the terminal.

The distribution of tickets and their updating valid in a "geographic zone" 7 is carried out as a function of the communication protocol between the servers of the same zone (6i and 6j). The client 11 sends a request to retrieve the complementary information to server 6i via link 10 and access point 9i and the access ticket is generated. Server 6i is then called the host server ("key host server"). Server 6i sends the UFIC's via link 8i, network access point 9i and link 10i. If traveling client 11i moves and changes the access point 9j in the same geographic zone 7, the UFIC requests are then addressed to local server 6j. Server 6j determines by the access ticket that it is not the host server of the client. At this moment, server 6j calls all the local servers of the same geographic zone 7 until host server 6i has been identified and it requests for its part validation of the current access ticket in the case that local server 6j has not validated it in advance. If the validation of the access ticket is confirmed by server 6i, server 6j verifies that it has the UFIC's corresponding to the same initial audiovisual stream, recovers the information about the session key of the client 10i, generates the same key and sends it the encrypted UFIC's either up to the end of the validation of the access ticket or while the client remains connected at this access point 9j. In the case that validity of the access ticket expires, server 6j remakes an authentication and thus becomes the host server of client 10i. Another possibility for distributing and updating access tickets is broadcasting of information concerning the duration of the validity of tickets generated by host server 6i to all local servers 6j comprised in the same geographic zone 7.

As described above, authentication is carried out in the local server to generate a different session key for each client, referenced in the access ticket with limited validity in time. Authentication is made upon the request of the client, who is informed about the duration of the validity of the session key. The UFIC's sent via elements 8, 9 and 10 are decrypted at the client's terminal 11 with the session key by, means of, e.g., a smart card 15 integrated in audiovisual terminal 11 of the client. This smart card also establishes authentication at the beginning of the session. Furthermore, the session key is generated in the local server and at the client's by means of a "challenge." The "challenge" represents generation and exchange of information fabricated randomly from predefined rules known by both parties. The session key generated is retained in memory in the local server and in the smart card of the client equipment without ever being exchanged via the network.

The UFIC's decrypted by the smart card are used by the recomposition module integrated in the terminal of the user, that generates an audiovisual stream strictly identical to original stream 1 from the modified main stream and the complementary information is stored by the UFIC's.

The stream of complementary information may be in the form of a group of substreams of complementary information corresponding to a single, continuous auto visual stream (coming from an interactive television channel or from a satellite channel, for example). The encoding of type H264 advantageously furnishes the possibility of generating a set of streams corresponding to a single audiovisual sequence, with each set having a different number of frames per second. A given set is sent as a function of the available transmission rate capacity of the network. If, e.g., the network frees up resources and there is thus the possibility of sending a greater transmission rate (throughput), the set corresponding to a greater number of images (pictures) per second is then sent. The transition without discontinuity between the sets is assured by transition frames of the SI and SP type ("Switching I slice" and "Switching P slice"). In this exemplary aspect, each of these sets corresponds to a substream of complementary information.

Each of the substreams may correspond to a layer of scalability of the continuous audiovisual stream. The notion of "scalability" characterizes an encoder capable of encoding or a decoder capable of decoding an ordered set of binary streams in such a manner as to produce or reconstitute a multilayered sequence.

Figure 4:
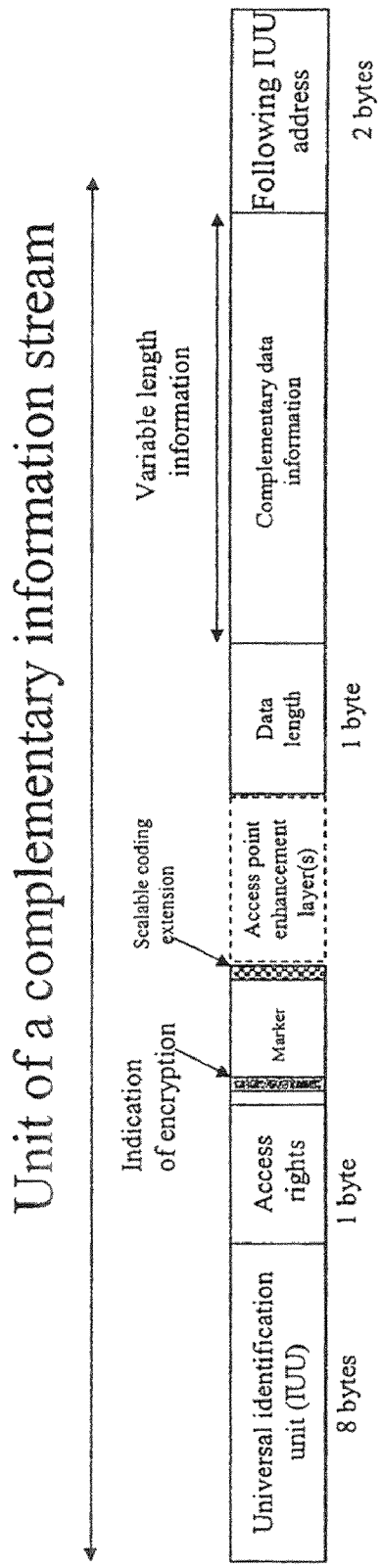
FIG. 4 is a schematic representation of segments in a stream of complementary information in accordance with aspects of the invention.

The stream of complementary information may be unique and contains the units corresponding to all the layers of scalability of the audiovisual stream. FIG. 4 shows an example. The segments containing the complementary information corresponding to the different layers of scalability are arranged successively and a coding extension (1 bit) indicating the scalability presence is added followed by indications (coded on 2 bytes) for placing access points relative to each layer of scalability.

An example for the streams of the MPEG-2 type characterized by the property of temporal scalability on two layers (base layer and an enhancement layer) is the insertion into the stream of complementary information of access points relative to the part corresponding to the base layer and to the part corresponding to the enhancement layer by successive GOP.

Another example for streams of the MPEG-4 type characterized by the property of temporal scalability on two layers (base layer and enhancement layer) is the insertion into the stream of complementary information of access points relative to the part corresponding to the base layer and to the part corresponding to the enhancement layer by successive GOV's (Group Of Video).

The substreams of complementary information corresponding to the base layer and the enhancement layer are advantageously sent to the addressee as a function of rights.

The substreams of complementary information corresponding to the base layer and the enhancement layer are advantageously sent to the addressee as a function of the network resources in terms of the allocated transmission rate.

The substreams of complementary information corresponding to the base layer and the enhancement layer are advantageously sent to the addressee as a function of the audiovisual quality required by the addressee.

The substreams of complementary information corresponding to the base layer and the enhancement layer are advantageously sent to the addressee as a function of the quality of service negotiated by the network.

The invention claimed is:

1. An apparatus, comprising:
   a storage and segmentation module configured to receive complementary information extracted from an audiovisual stream and including digital information suitable for permitting reconstruction of the audiovisual stream in conjunction with a modified stream based on the audiovisual stream after the complementary information is extracted, the storage and segmentation module configured to store the complementary information and to segment the complementary information into respective segments corresponding to audiovisual elements in units of streams of complementary information with a variable size; and
   an encryption module configured to encrypt the complementary information prior to transmitting the complementary information to a local server for transmission to equipment of an addressee, wherein the encryption module is configured to encrypt the complementary information using an encryption key determined by a title of the original stream corresponding to the complementary information and determined by the local server to which the complementary information is to be transmitted.

2. The apparatus according to claim 1, wherein units of streams of complementary information are organized in several layers corresponding to layers of scalability of the audiovisual stream.

3. The apparatus according to claim 1, wherein respective segments correspond to a subjectively coherently entire audiovisual element in units of streams of complementary information with a variable size.

4. The apparatus according to claim 1, wherein the apparatus is configured to transmit the complementary information into a distributed network with scalability in a rate at which the complementary information is transmitted into the distributed network.

5. The apparatus according to claim 4, wherein a rate at which the complementary information is transmitted into the distributed network is determined based on at least one characteristic of the distributed network selected from the group consisting of: available bandwidth; negotiated bandwidth; and network congestion.

6. An apparatus, comprising:
   a storage and segmentation module configured to receive complementary information extracted from an audiovisual stream and including digital information suitable for permitting reconstruction of the audiovisual stream in conjunction with a modified stream based on the audiovisual stream after the complementary information is extracted, the storage and segmentation module configured to store the complementary information and to segment the complementary information into respective segments corresponding to audiovisual elements in units of streams of complementary information with a variable size,
   wherein the apparatus is configured to transmit the complementary information into a distributed network, and wherein the apparatus is further configured to regulate the quantity of information distributed into a distributed network, taking account of the capacities and restrictions of the distributed network in terms of storage and of access time.

7. The apparatus according to claim 6, wherein units of streams of complementary information are organized in several layers corresponding to layers of scalability of the audiovisual stream.

8. The apparatus according to claim 6, wherein respective segments correspond to a subjectively coherently entire audiovisual element in units of streams of complementary information with a variable size.

9. The apparatus according to claim 6, further comprising:
   an encryption module configured to encrypt the complementary information prior to transmitting the complementary information into the distributed network.

10. An audiovisual distribution system, comprising:
    at least one local server, wherein the at least one local server is configured to receive complementary information that is extracted from an audiovisual stream and that includes digital information suitable for permitting reconstruction of the audiovisual stream in conjunction with a modified stream that is based on the audiovisual stream after the complementary information is extracted, and is configured to provide the complementary information to equipment of a user,
    wherein the at least one local server is configured to receive the complementary information in an encrypted form using a first encryption key, is configured to decrypt the complementary information using the first encryption key, and is configured to re-encrypt the complementary information using a second encryption key constructed during an authentication process between the equipment of the user and any local server.

11. The system according to claim 10, wherein the at least one local server is configured to re-encrypt the complementary information with the second key adaptively as a function of the throughput capacities of the equipment of the user.

12. The system according to claim 10, wherein the at least one local server is configured to generate a session key associated with a session established with at least one client.

13. The system according to claim 10, wherein the second encryption key is valid solely during the time of a continuous session between the equipment of the user and at least one local server.

14. The system according to claim 10, wherein at least one local server is further configured to generate an access ticket per session, containing information concerning the second encryption key, wherein the second encryption key is valid solely during the session and expires at the end of the validity of the access ticket.

* * * * *